United States Patent [19]
Laurence et al.

[11] Patent Number: 5,596,912
[45] Date of Patent: Jan. 28, 1997

[54] PRESS PLATE HAVING TEXTURED SURFACE FORMED BY SIMULTANEOUS SHOT PEENING

[75] Inventors: Kenneth J. Laurence, West Chester, Ohio; Michel J. Broussard, Quillan, France

[73] Assignee: Formica Technology, Inc., Wilmington, Del.

[21] Appl. No.: 106,243

[22] Filed: Aug. 12, 1993

[51] Int. Cl.⁶ .................................................. B21K 5/20
[52] U.S. Cl. ................................................ 76/107.1; 72/53
[58] Field of Search ................................. 72/53; 29/90.1; 76/107.1

[56] References Cited

U.S. PATENT DOCUMENTS

| | | | |
|---|---|---|---|
| 937,180 | 10/1909 | Ridd . | |
| 3,073,022 | 1/1963 | Bush et al. | 72/53 |
| 3,382,159 | 5/1968 | Reed | 72/53 |
| 3,754,976 | 8/1973 | Babecki et al. . | |
| 3,928,527 | 12/1975 | Wohnhaas et al. . | |
| 4,076,566 | 2/1978 | Power . | |
| 4,428,213 | 1/1984 | Neal et al. | 72/53 |
| 4,454,740 | 6/1984 | Neal et al. . | |
| 4,581,913 | 4/1986 | Reed . | |
| 4,714,622 | 12/1987 | Omori et al. . | |
| 5,057,108 | 10/1991 | Shetty et al. | 72/53 |

FOREIGN PATENT DOCUMENTS

| | | |
|---|---|---|
| 0202746 | 11/1986 | European Pat. Off. . |
| 2418084 | 9/1979 | France . |
| 122663 | 10/1976 | Germany . |
| 207514 | 3/1984 | Germany . |
| 3184770 | 8/1991 | Japan . |
| 2106430 | 4/1981 | United Kingdom . |

OTHER PUBLICATIONS

Abstract for Japanese Patent Publication No. JP59037053, Feb. 29, 1984.
Abstract for Japanese Patent Publication No. JP3184770, Aug. 12, 1991.
Abstract of Japanese Publication No. JP60184627, Sep. 2, 1985.
Abstract for Japanese Patent Publication No. JP60044267, Mar. 9, 1985.
European Patent Office Search Report for App.No. 94112465.3, dated Dec. 12, 1994.
Abstract for Japanese Patent Publication No. JP5016073, Jan. 26, 1993.
Abstract for Japanese Patent Publication No. JP4159081, Jun. 2, 1992.
"Glass Bead Impact Blasting", Michael Woelfel and Robert Mulhall, Sep. 1982, pp. 57/58.

Primary Examiner—David Jones
Attorney, Agent, or Firm—Mayer, Brown & Platt

[57] ABSTRACT

Shot peening with a mixture of at least two sizes of shot can be used to obtain a textured finish press plate with desirable gloss features. The press plate is impacted with a mixture of shot having at least two different sizes to simultaneously obtain a texture and gloss control. A separate overblasting step to obtain a desired gloss uniformity is thereby avoided.

15 Claims, 7 Drawing Sheets

1

PRESS PLATE HAVING TEXTURED SURFACE FORMED BY SIMULTANEOUS SHOT PEENING

FIELD OF THE INVENTION

This invention relates to a textured press plate for manufacturing decorative laminates and a method for producing same. Specifically, a press plate may be simultaneously blasted by a mixture of at least two sizes of shot at high velocity to produce a textured press plate with a desirable combination of texture and gloss.

BACKGROUND OF INVENTION

Press plates are used in a well known process to prepare decorative laminates. These laminates are used for surfaces such as walls, table tops, furniture, doors, kitchen cabinets, countertops, flooring tiles, and the like. The decorative laminates are formed by compressing and bonding together thermosetting resin impregnated pigmented or printed decorative cellulosic surface papers to a variety of core materials, such as particle board or phenolic resin impregnated kraft paper filler sheets and the like between press plates, with the press plate imparting a surface finish to at least one side of the pressed laminate. The material layers are first placed adjacent to a stainless steel press plate. The laminate components and press plate assembly are then pressed at high pressures and elevated temperatures to fuse the laminate materials together. After final cure, a consolidated laminate sheet or board is formed. Once cooled, the laminates are separated from the press plates, which are returned to the press for use in the manufacture of subsequent laminates.

The resulting laminate surface finish is an exact mirror image replication of the press plate surface finish against Which it is pressed. Press plates are thus an important feature in the production of consistently acceptable commercial laminate surfaces, as the laminate surfaces faithfully adopt the surface finish of the press plate.

There are two general categories of press plates, polished and textured. The scope of the present invention is directed to textured press plates used to manufacture matte or suede laminate finishes. A variety of methods result in a desired textured press plate finish. A common method is chemical etching. While this is an effective method for producing the desired textures and overall finish, it is both costly and difficult to implement. Another method of texturizing includes shot peening, such as that disclosed in U.S. Pat. No. 4,076,566.

Shot peening techniques are primarily used for their mechanical benefits, as the cumulative effect of individual particle impacts on the workpiece surface cold works the article. As the shot particles are propelled or blasted at high velocities onto the metal surface, the resulting plastic flow of the metal somewhat relieves residual tensile stresses near the surface of the article by inducing compressive stresses. The mechanical benefits are improved fatigue strength and stress corrosion resistance, or if desired, reshaping of flat pieces. Two major parameters must be controlled to achieve the desired results—surface coverage and peening intensity.

Surface coverage is a measure of the percentage of the article's surface area impacted by the shot particles. The cumulative impacts of the shot particles should nearly or fully saturate the surface area to obtain the mechanical enhancements normally sought through peening. Peening intensity is a measure of the amount of force of each individual impact and the cumulative work done on the surface of the article. Peening intensity is thus a function of the impact velocity and particle size and density (i.e., mass). The optimum peening intensity and resultant compressive stress layer depth is also related to the metal alloy and hardness of the material being peened.

However, in contrast to the typical applications of shot peening, the use of shot peening in the manufacture of textured press plates does not primarily seek enhancement of mechanical properties nearly as much as providing the desired press plate surface finish aesthetics, including its texture, gloss, and overall appearance while retaining its requisite flatness. Strict adherence to surface coverage and peening intensity criteria, as in mechanical applications of shot peening, are not critical except from the standpoint of consistently obtaining the desired textured plate and resultant laminate appearance. Maintaining plate flatness during peening and obtaining uniform gloss and roughness over the surface of the plate are important considerations.

Peened textured press plates typically begin as highly polished plates having a surface finish known in the press plate and laminate industry as a #7 mirror finish. These plates are predominantly fabricated from AISI 410 stainless steel. This alloy offers relative hardness, damage resistance, and corrosion resistance, as well as dimensional stability after repeated thermal cycling. Shot peening an initial #7 mirror plate finish has been found to inevitably lower the gloss of the plate. This results in a duller surface finish due to the myriad indentations which cause increased light scattering as perceived either visually or instrumentally (i.e., through use of an electronic gloss meter). In general, the greater the shot coverage up to saturation, the lower the resultant gloss, as the total area of shiny "islands" (nonimpacted areas) on the surface decreases. Importantly, saturation of the surface can be achieved relatively easily when smaller or finer shot grades are used, eliminating an overall speckled appearance and obtaining a uniformly dull "matte" (lightly textured) finish.

For aesthetic reasons, laminates with "rougher" textures to simulate a "suede" finish are sometimes desired. "Suede" textures have been found attainable through the use of larger shot grades and/or increased impact velocity, both of which as discussed above contribute to greater peening intensity. However, problems occur when larger shot grades are used.

In "rougher" textures obtained through the use of larger shot grades (creating greater impact crater depths through greater impact forces), courser peak structures appear. Further, since press plates are large, thin, and flat articles, they become more and more dimensionally unstable with greater peening intensity. For example, peening one side of the plate with a large shot grade at high velocities causes plates to warp with a convex curvature on the peened face. Although this can be somewhat solved by "balanced" shot peening machines which equalize face to face induced compressive stresses by simultaneously blasting both sides of the plate, larger shot grades still tend to heighten dimensional instability.

Additionally, with larger shot grades, it has been found progressively more difficult to achieve a saturated surface free of what is often referred to as objectionable "sparkle." Peening machines essentially process a given mass of shot per unit time. Therefore, the number of pellets striking a plate surface per unit time (i.e., surface coverage) is an inverse cubic function of increased shot diameters, necessitating either significant slowing down of the peening speed, multiple passes, propelling a greater mass of beads per unit time, or a combination of the above. The former two approaches have serious drawbacks from a practical commercial viewpoint, and the latter alternative is governed by machine design limitations. To achieve an acceptably uniform plate appearance approaching saturation with larger shot grades, all three alternatives in effect result in a greater peening intensity and associated stress relief problems if not perfectly balanced.

Moreover, producing fully saturated, roughly peened surface textures is not usually difficult to achieve in a laboratory or pilot plant environment. However, serious surface coverage and peening intensity restrictions contributing to overall roughness limitations are often encountered with large production size plates. These press plates must remain nearly perfectly flat after peening if they are to be used in a conventional high pressure decorative laminate manufacturing process, which use a plurality of plates during each pressing operation.

Thus, the process described above using a single size range or grade steel shot to texture a plate has serious limitations in its ability to achieve the higher roughnesses desired, which requires the use of larger shot grade, while still achieving adequate coverage and a uniform finish (without excessive sparkle) within reasonable processing times.

U.S. Pat. No. 4,076,566 largely resolved the above diametrically opposed roughness and coverage constraints imposed when processing full size production plates. It disclosed first using a relatively large shot grade to obtain the desired roughness and texture structure, followed by a second smaller grit or shot grade to achieve a fully saturated sparkle-free surface appearance. Although the desired macro-texture or roughness is first developed using large shot grade peening, full coverage does not result. The plate is then blasted with smaller shot grade (with much more efficient covering ability) to obtain saturation and elimination of residual high gloss islands without altering the initially formed macro-texture of the plate. Importantly, the need for subsequent electropolishing and preferred chroming is eliminated with this process.

Moreover, the use of steel shot in the peening process of the prior art causes several problems. Steel shot with the preferred hardness is brittle and prone to shatter. Softer steel alloys tend to flatten and cannot be readily separated from the shot peening machines. Moreover, each hardness of steel shot has a different effect on the roughness of the finished press plate. Steel is also quite dense, requiring powerful blasting machines which result in greater cost and machine wear.

Additionally, steel shot leaves an iron/iron oxide residue within the impact craters generated on the surface of the press plates. These deposits, particularly when exposed to moisture, quickly oxidize and result in an objectionable overall rusty or "blackened" appearance to the plate surface. The oxide residue is difficult to remove by normal washing techniques and often requires special treatment prior to any final processing (e.g., chrome plating) or laminate pressing.

Another conventional shot peening material is glass beads, particularly used to avoid the contamination associated with steel shot when processing stainless steel and non-ferrous metals. However, glass beads have three distinct disadvantages compared to other shot materials, particularly as applied to texturing or overblasting stainless steel press plates. First, being less dense than either steel or ceramic shot, it is difficult with glass shot to obtain blasting intensities required to achieve relatively deep texturing, even at high impact velocities. Second, glass beads are very brittle and are prone to breakage and shattering into a fine glass "dust", particularly at high impact velocities. This dust is very aggressive towards the plate surface, behaving in a manner similar to sharp angled "grit" rather than the preferred spherical shot, resulting in micro-scarring of the plate surface and undesirable light scattering and "grayness" of the surface of laminate pressed from it. In fact, glass beads shatter so quickly that during the processing of a single plate, a severe gloss gradient can develop along its length due to the progressive rise in abrasive blasting with an accompanying decrease in the preferred shot peening.

A final problem is the extreme hygroscopicity of glass beads, causing cohesion between the beads and sporadic or total interruption of the bead flow to the blast guns. This further promotes an unacceptably non-uniform blast pattern and gloss differential over the surface of a plate. Conversely, the flow fluidity of other shot materials, especially ceramic shot, are unaffected by ambient moisture conditions.

Even after the finished textured press plates are obtained in any of the methods discussed above, refinishing remains a large concern. After a number of pressings, the plate often develops microscratches induced by laminate surface materials, especially by the presence of hard grit particles which are now more frequently being added to the laminate surface to improve wear and mar-resistance. Also, macroscopic imperfections may occur during routine handling in the form of burnishing, rub marks and small scratches. These defects on the plate surface in turn tend to degrade the surface finish of the laminates, which faithfully reproduce the press plate surface finish. When the microscratches and visible defects become too pronounced, the plates must be replaced or refinished. Thus, the texturing process must also be capable of consistently providing a method to refinish the press plates.

As an aspect of the present invention, it has been recognized that the combined texture and gloss achieved by mixing different grades of shot provides equivalent or improved results compared to using a discrete shot grade and peening a plate several times, each peening operation using a different sized shot grade. Thus, mixing different sized shot grades is a superior method than shot peening a plate multiple times with different sized shot grades each time. The former method avoids the need for separate overblast steps. Furthermore, mixing various shot grades avoids having to empty the blasting machine of large shot grades and refilling the machine with small shot grades or the converse. This conversion process is time consuming, particularly if a large quantity of plates are to be processed. Mixing shot grades also avoids the alternative of dedicating equipment to each grade of shot used in the process to maintain productivity.

It has thus been discovered that the two-step process of large shot grade peening followed by small shot grade overblasting as disclosed in U.S. Pat. No. 4,076,566 can be simplified to a process having significantly fewer blasting operations while achieving essentially the same results, wherein a mixture of a predominantly large shot grade (preferably 75–90%) and a small shot grade (preferably 10–25%) can be used simultaneously to effectively texture the press plate and provide the full coverage and sparkle-free surface desired. In combination with the improvements sought, the further use of ceramic shot rather than conventional steel shot further avoids the need for chemical decontamination after peening and the disadvantages of glass shot.

Thus, the present invention contemplates using a mixture of at least a first shot grade and a second shot grade in the plate finishing process. Large shot grade peening and small shot grade overblasting are simplified to a one step process while achieving the same results as multiple passes with different shot grades. Furthermore, mixtures of various grades of "larger" shot may be used in that portion of the total mix to form a more visually complex and pleasing textured structure and pattern, wherein a wider variety of intermixed large shot grade impact crater diameters form a continuous three dimensional roughness matrix.

The further advantages of the use of mixed shot grade peening and ceramic shot will become apparent to those versed in the art, such that the above disclosures set forth should not be construed as limiting to the scope of the instant invention as claimed.

SUMMARY OF INVENTION

This invention involves a method for obtaining a peened textured finish for a press plate with desirable gloss features and overall appearance and with at least 95% coverage. The present invention contemplates shot peening with a mixture of at least two size ranges or grades of shot to obtain this surface finish, including particularly ceramic shot. The untreated press plate is impacted with a mixture of shot grades, wherein the mixture with at least the two different grades of shot are fed into a propelling device such as a blast gun or wheel located a fixed distance from the plate surface. The gun or wheel thus projects the shot grade mixture against the surface of the press plate. After the desired texture and gloss is achieved, the finished press plate is removed from the blasting or shot peening equipment. Moreover, the present invention contemplates and discloses a method for improving the gloss and general appearance of worn used plates.

Ceramic shot has only recently became commercially available. As late as 1982, no reference was made of the use of ceramic shot in that year's ASI Metals Handbook (Volume 5, Ninth Edition) section on Shot Peening. It was been found that ceramic shot offers significant advantages over conventional shot media for peening and press plate texturing. Smaller ceramic shot grades also offer advantages over small steel shot or glass bead sizes for "non-texturing" repair of grit induced micro-scratches or other superficial damage (i.e. refinishing) incurred by textured plate surfaces during use, where the macro-texture is not appreciably altered during the overblasting.

Ceramic shot is about twice as hard as standard cast steel shots, the latter with typical hardnesses between Rockwell C 40–50, which in turn are only slightly harder than typical 410 stainless steel press plates (38–45 HRC). Special hard steel or iron shots are available (57–65 HRC), but these shots are quite brittle and are easily broken upon impact. However, even though extremely hard, ceramic shot is not prone to breakage as is hard steel shot, nor does it deform upon impact as does softer, more durable steel shot. Deformation, such as slight flattening into a non-spherical condition, is undesirable, yet shot so effected is not easily separated from the system. Further, ceramic shot offers a smoother initial surface finish than steel shot.

As such, ceramic shot provides hardness and lack of deformation upon impact, little breakage with ease of separation if breakage does occur, and an inherently very smooth surface, which all contribute to consistently well formed hemispherical impact craters, which in turn minimize light scattering and resultant haziness or grayness (loss of color fidelity) of laminates pressed from ceramic shot blasted press plates.

Further, in contrast to steel shot, ceramic shot is chemically inert and does not leave any embedded residue on the plate surface, obviating the need for any chemical "decontamination" process for the removal of residual oxide materials after blasting.

Also, while ceramic shot has about twice the hardness as steel shot, it is only half as dense. Thus, for equivalent shot size ranges or grades, ceramic shot requires less shot "tonnage" and transport capacity and allows for the use of smaller, simpler and less costly (and more easily maintained) blasting equipment to achieve about the same degree of coverage (or saturation) and peening intensity (impact force), since the lighter ceramic shot can be propelled to higher impingement velocities. Particularly in the case of large steel shot grades, very powerful, motor driven, high speed centrifugal wheel "slinger" machines are required to obtain the desired impact velocity for the shot. Similar or greater velocities can be achieved with ceramic shot using simpler and more versatile compressed air blast guns in which the shot is injected into a high velocity air stream. Due to ceramic shot's lower density (and greater hardness) compared to steel, it was found to be more effectively transported and projected by simpler, less expensive air-blast type peening machines (rather than centrifugal wheel type equipment), resulting in faster coverage rates and comparable finish textures. The ceramic shot can be fed to the blast guns either by a vacuum suction venturi effect, or injected directly under pressure into the compressed air stream, which then propels the shot towards the target with very high impact velocities, especially with smaller shot sizes.

The higher striking velocity and lower density of ceramic shot compared to steel shot thus tend to off-set each other and, for equivalent shot size ranges, result in about the same amount of work applied to the plate surface. However, with press plates, enhancement of mechanical properties is not an important consideration compared to the aesthetics (i.e., the texture, gloss, "structure," and overall appearance of the surface). Strict adherence to surface coverage and peening intensity criteria are not critical except for consistency in obtaining the desired textured plate and resultant laminate "look". Maintaining plate flatness during peening, and obtaining uniform gloss and roughness, however, remain important considerations.

Moreover, it has also been discovered that, unlike peening with other media such as steel shot or glass beads, gentle overblasting with small ceramic shot grades at low velocities can actually adjust Upwards the gloss of a peened plate (the degree of gloss rise being highly dependent on the intrinsic texture geometry, roughness and initial gloss of the plate). Heretofore, peening has been solely a dulling or matting process, with the magnitude of the effect dependent on the severity of the processing conditions employed. However, it was found that when small ceramic spheres strike the plate surface with just enough force to cause plastic flow of the metal, minute microscratch fissures are "sealed" and the microfinish imperfections are obliterated, effectively reducing light scattering and increasing the perceived gloss level. This ability to upwardly adjust the plate gloss using mild impact velocity (low propellent air pressure) with small ceramic shot grades, and preferably B60 shot, was wholly unexpected and has the distinct advantage of allowing gloss recovery of used press plates that have become microscratched by inclusion of hard grit materials in the laminate surface to enhance their physical surface properties, and in particular, wear properties related to abrasion, mar, scratch, scrape and scuff resistance during exposure to fabrication and end-use installation conditions. This process reforms the microtexture and restores the plate finish to its original quality.

Ceramic shot gloss adjustment also provides a method, within limits, to readjust plate gloss to the desired level (either downwards or upwards) after additional surface treatment (e.g., chrome plating), where gloss shifts away from the prescribed level are often encountered.

Likewise, ceramic shot is a superior alternative to glass beads. It is denser than glass and thus may be used to achieve higher blasting intensity for deeper texturing. Also, ceramic shot does not shatter and as such does not produce the fine dust produced by glass beads. Finally, ceramic shot does not absorb moisture and thus does not clump and interrupt shot flow.

A further benefit is that since ceramic shot minimizes microscopic plate surface disruptions (and resultant laminate haziness), the peened press plates produced with ceramic shot do not need to be additionally chrome plated to ensure releasability of the finished laminate after pressing.

Accordingly an object of the present invention is to obtain the desired uniform texture and gloss finish on a press plate.

Another object of the present invention is to minimize the number of passes needed to texture the press plate, using a mixture of shot grades simultaneously.

It is another object of the invention to use a shot material to avoid the problem of impact shattering and resulting micro-scarring of the press plate surface.

It is also an object of the invention to use a shot media capable of increasing the gloss of a press plate after blasting.

It is a further object of the invention to obtain a shot material particularly suited for refinishing textured press plates.

It is still another object of the invention to use a shot material that is easily handled by conventional blasting machinery.

It is yet another object of the invention to use a shot material to avoid the problem of iron residue contamination.

Still another object of the present invention is to use a shot material which is at least as hard as steel shot but less dense.

The above and other related objects and features of the present invention will be apparent from a reading of the following detailed description of the preferred embodiment and the appended claims.

DESCRIPTION OF THE DRAWINGS

The present invention may be better understood with reference to the drawings in which.

DESCRIPTION OF THE PREFERRED EMBODIMENT

Figure 1:
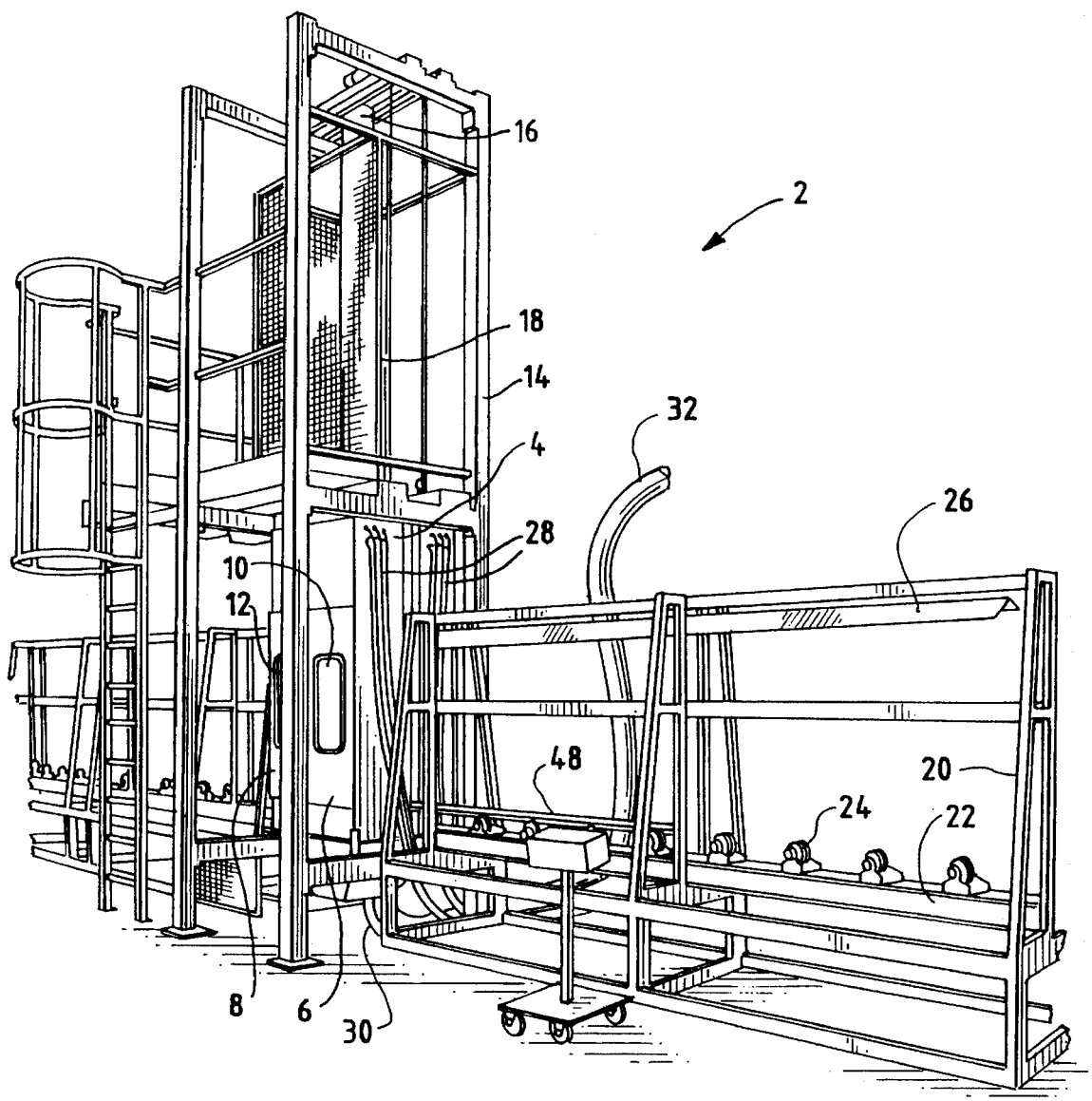
FIG. 1 is a vacuum-type air-blast shot peening machine for processing press plates utilizing the method of the present invention.

Referring to the drawings, wherein reference characters designate like or corresponding parts throughout the views, FIG. 1 illustrates a shot peening machine 2 suitable for utilizing the method of the present invention and for producing a press plate according to the present invention. The shot peening machine 2 has a blast cabinet 4, which is provided with a pair of access doors 6, 8 each having an observation window 10, 12. Mounted above and around the blast cabinet 4 is a gun tower 14 comprised of a metal frame structure. The gun tower 14 has a central column 16 as a mount and guide for a gun carriage 18. The gun carriage 18 extends into the blast cabinet 4 and reciprocates up and down the central column 16 as will be explained below. The blast cabinet 4 is used for the actual shot peening operation to contain and collect the expended shot.

Figure 2:
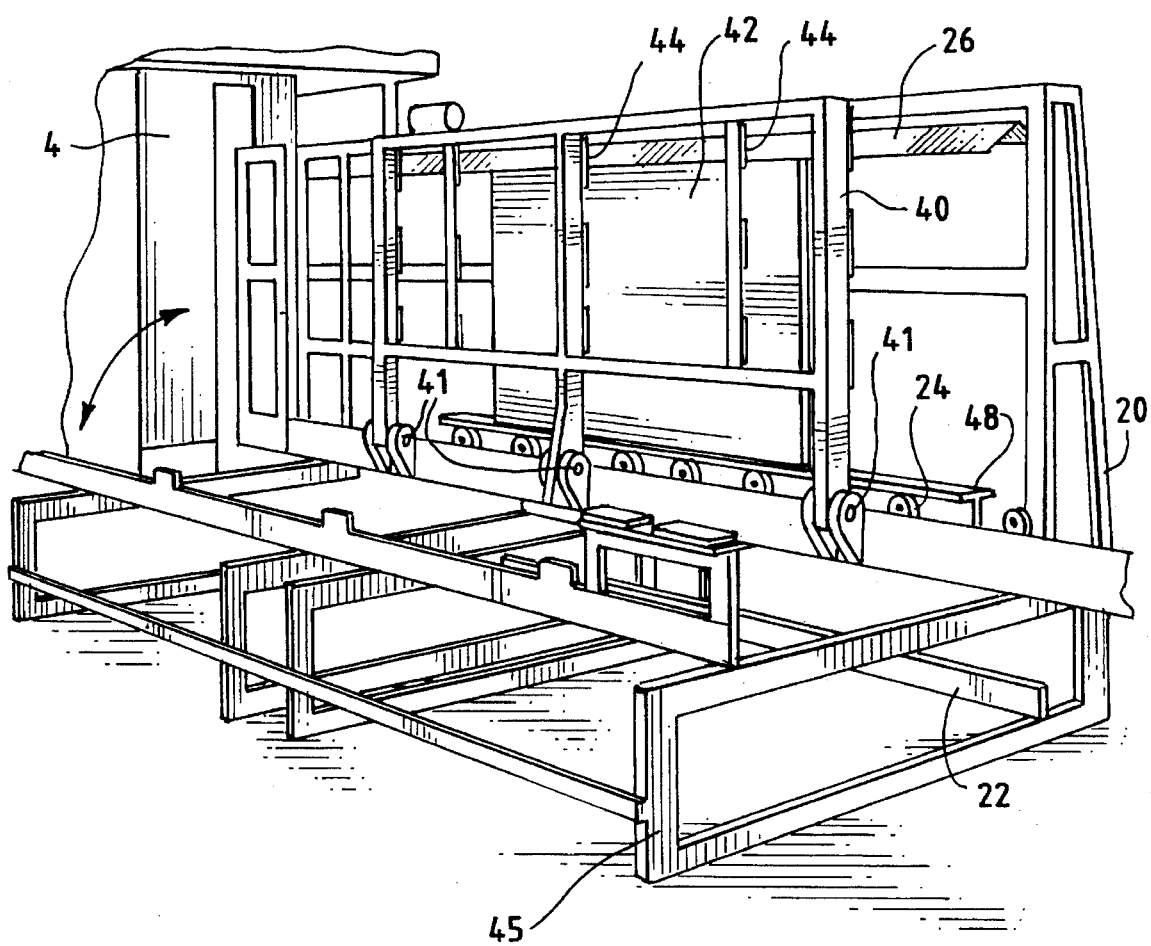
FIG. 2 is the plate infeed lift table, vertical support, and trolley mechanism for holding and transporting the press plate for the machine in FIG. 1.

As can be further seen in FIG. 2, the blast cabinet 4 is attached on either side to a support frame 20 which facilitates movement of the press plate 42 through the blast cabinet 4. A plate rail 22 supports a plate trolley 48 which transports the press plate 42 through the blast cabinet 4. Multiple slotted rollers 24 are interspaced along the plate rail 22 to guide the cross-sectional T-shaped plate trolley 48 and vertically held press plate 42 through the blast cabinet 4. Further, plate guide 26 is lowered over the top edge of the plate 42 to maintain the plate in a vertical position through the blast cabinet 4.

As the press plate 42 is transported through the blast cabinet 4, it is blasted by shot from guns mounted on the lower end of the gun carriage 18. This operation will be described in detail below. The shot is supplied to the guns via feed hoses 28, as shown in FIG. 1. In the preferred machine shown, six separate guns each require a separate feed hose 28. The feed hoses 28 are preferably made from natural gum rubber to minimize wear. The spent shot is removed from the blast cabinet 4 by an air and shot collection outlet pipe manifold 30 located in the bottom of the blast cabinet 4. The collection outlet pipe manifold 30 is attached to an air and shot collection hose 32 through automatic shot refill hopper 80.

Spent shot is continuously recycled by the shot peening machine for reuse by the guns. The spent shot in the air collection hose 32 is fed into a cyclone reclaimer 34 for separation of dust and fine shot fragments. The dust and fine shot fragments are then sent to a dust collector 36 for removal from the system. The remaining shot is then sent through a classifier 86 as will be described in more detail below, with the good shot separated and returned to a feed hopper 38, to which the feed hoses 28 are attached and which re-supplies the guns with a continuous flow of shot.

FIG. 2 shows the support frame 20, plate rail 22, plate guide rollers 24, and top plate guide 26 of the plate handling system. The support frame 20 has an infeed table 40 which is a fabricated steel frame attached through hinges 41 to rotate from a horizontal to a vertical position. An unfinished press plate 42 is loaded onto the infeed table 40 with the infeed table 40 in a horizontal position resting on table support frame 45. The infeed table 40 is fitted with bristled pads 44 on which the unfinished plate 42 lies to avoid scratches. The frame of the infeed table 40 may be provided with position markers to aid in properly locating various sizes of unfinished plates.

Once the plate 42 is positioned on the infeed table 40, the infeed table 40 and plate 42 are rotated into the vertical position by an air cylinder (not shown). The lower edge of the plate 42 is inserted in a narrow lengthwise groove (not shown) in the plate trolley 48 mounted on the plate rail 22 when the infeed table 40 rotates to a vertical position. The plate 42 is then locked into the vertical position by means of lowering the plate guide 26 onto the top edge of the plate 42. The plate guide 26 is a V-shaped top edge guide extending the entire length of the shot peening machine on both sides of the blast cabinet 4. The plate guide 26 is moved into position by two sets of motorized screw drives (not shown).

A variable speed drive motor (not shown) located under the plate rail 22 and mounted to the support frame 20 slowly drives the plate trolley 48 with the plate 42 through the blast cabinet 4. A second fixed speed fast forward and reverse drive motor (not shown) is used only to quickly position the press plate 42 prior to blasting and retracting it after processing, while the variable speed slow drive system is used during the actual blasting operation. Of course, other methods and devices may be utilized to position and hold the plate 42, and drive it through the blast cabinet 4.

Figure 3:
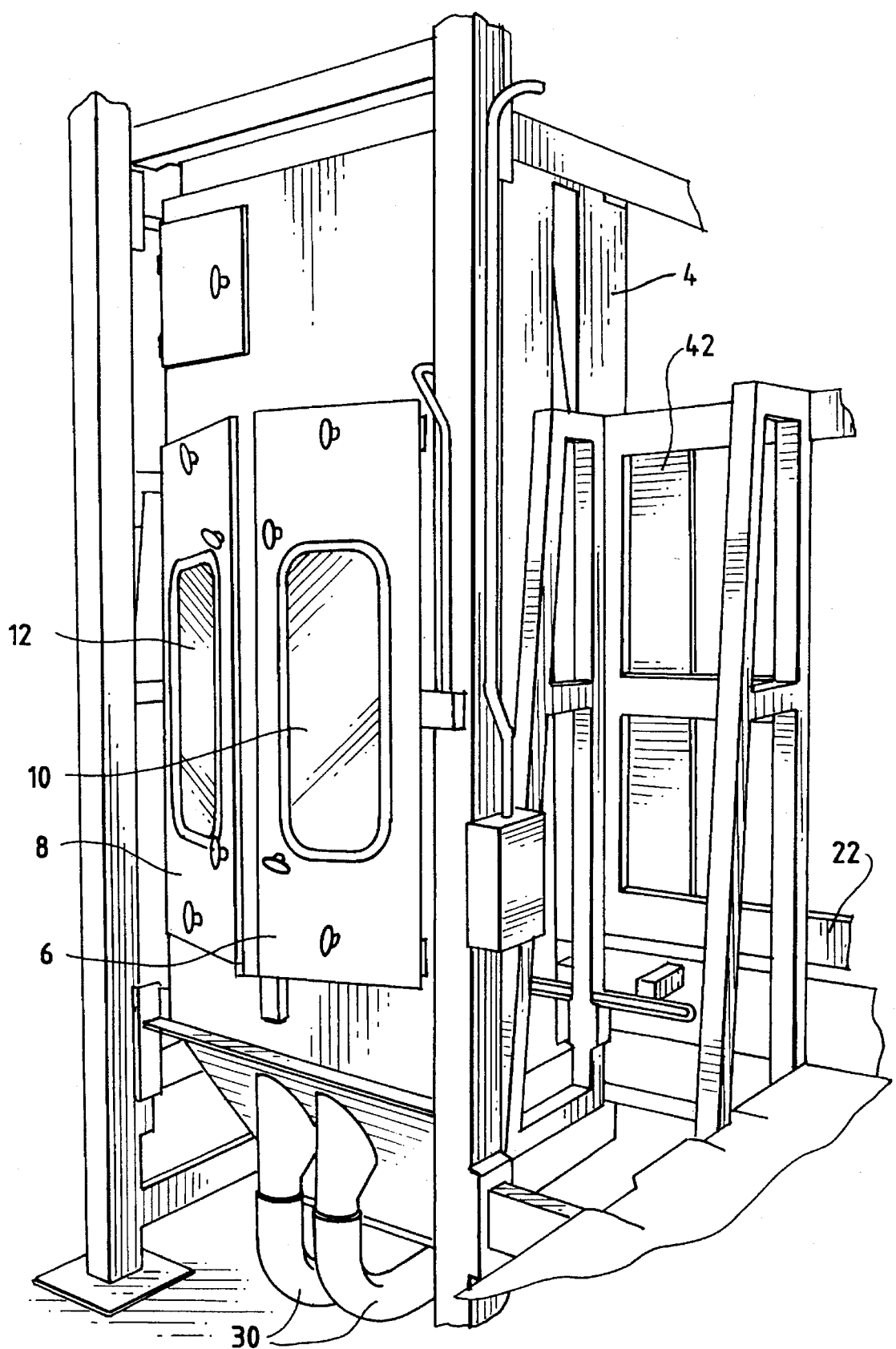
FIG. 3 is the blast cabinet of the shot peening machine of FIG. 1.
Figure 4:
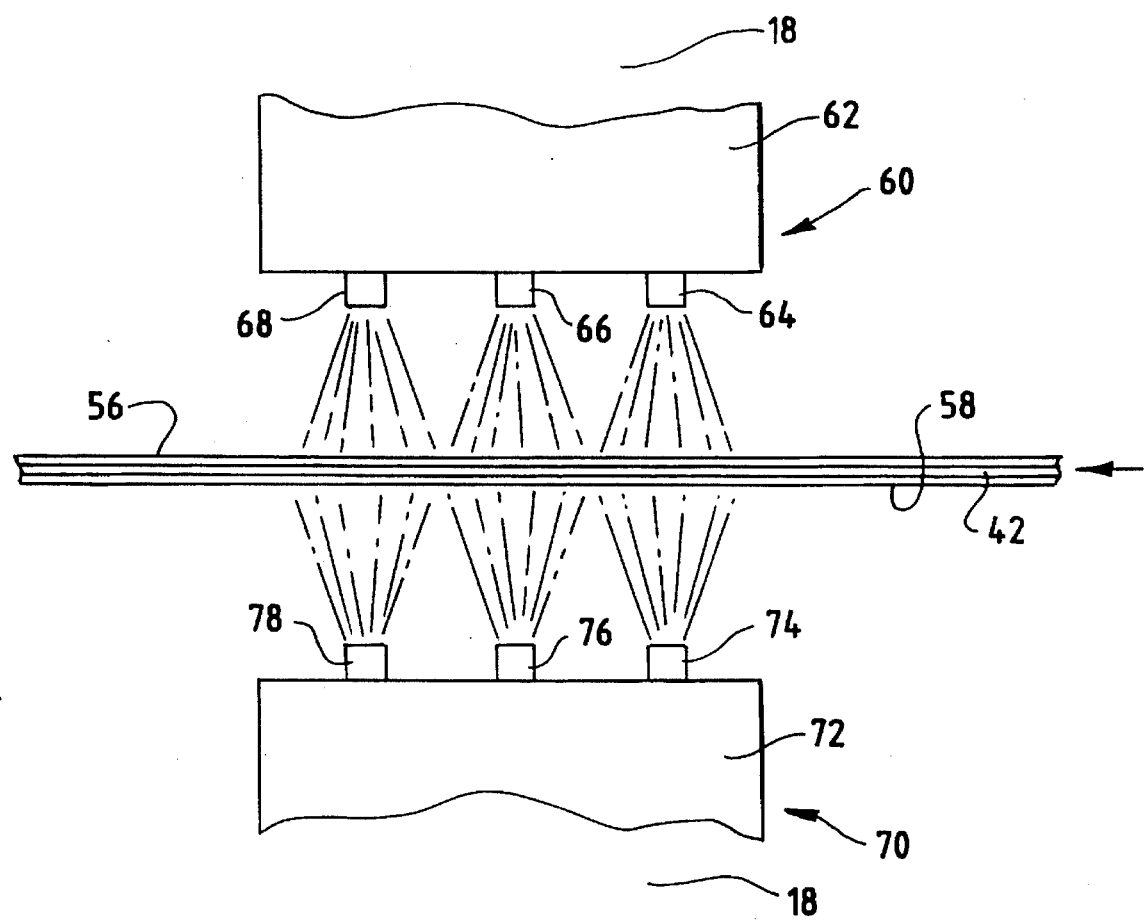
FIG. 4 is an overhead view of the configuration of the blast guns in the blast cabinet of FIG. 3.

FIG. 3 is a detailed view of blast cabinet 4 with the plate 42 partially inside for the blasting operation. FIG. 4 is an overhead view of the plate 42 in the blast cabinet 4. The plate 42 has a first surface 56 and a second surface 58 which are blasted and textured according to the present invention. The lower end of the gun carriage 18 extends into the interior of the blast cabinet 4 from the gun tower 14. The lower end of the gun carriage has a first gun battery 60 having a gun mount 62 and three compressed air blast guns 64, 66, 68. Located on the other side of the plate 42 is a second gun battery 70 having a gun mount 72 and three compressed air blast guns 74, 76, 78. The gun batteries 60, 70 are attached to the gun carriage 18 so that they are diametrically opposed to each other, with the guns 64, 66, 68 located at a fixed distance from the first surface 56 and the guns 74, 76, 78 located opposite guns 64, 66, 68 at the same fixed distance from the second surface 58. The plate trolley 48 and the plate 42 are driven through the blast cabinet 4 at a slow and continuous rate of speed (i.e., 3 to 4 in/min). Once the plate 42 enters the blast cabinet 4, the gun carriage 18 and blast guns 64, 66, 68, 74, 76, 78 are activated, rapidly (i.e., 90 to 110 ft/min) reciprocating up and down and evenly blasting the plate surfaces 56 and 58 with shot.

The gun carriage 18 reciprocates up and down along the central column 16 by means of a dual chain and sprocket drive system, with a gun carriage 18 counter weight attached to both chains. The two chains are independently driven by separate motor and air clutch assemblies (not shown). The gun carriage 18 is guided by a series of sealed bearing rollers spaced around the central column 16. The sealed rollers prevent bearing contamination from the shot. Two air clutches move the gun carriage 18 in opposite directions. When a first air clutch is engaged, the gun carriage 18 moves upward until it reaches the top of the central column 16 and the gun batteries 60, 70 reach the top of the blast cabinet 4, triggering a first proximity switch (not shown). The first proximity switch disengages the first air clutch and engages a second air clutch which moves the gun carriage 18 downward until it reaches the bottom of the central column 16 and the gun batteries 60, 70 reach the bottom of the blast cabinet 4 and triggers a second proximity switch. The second proximity switch disengages the second air clutch and re-engages the first air clutch which moves the gun carriage 18 upward again. The rapid reciprocation cycle is repeated continuously as the plate 42 slowly traverses through the blast cabinet 4. In this manner, all areas of the surfaces of the plate 42 are equally blasted, as even coverage is necessary for a uniform finish of the plate 42 and to maintain its flatness. Of course, other means and methods may be utilized by those skilled in the art to position and move the guns in relation to the plate 42.

Figure 5:
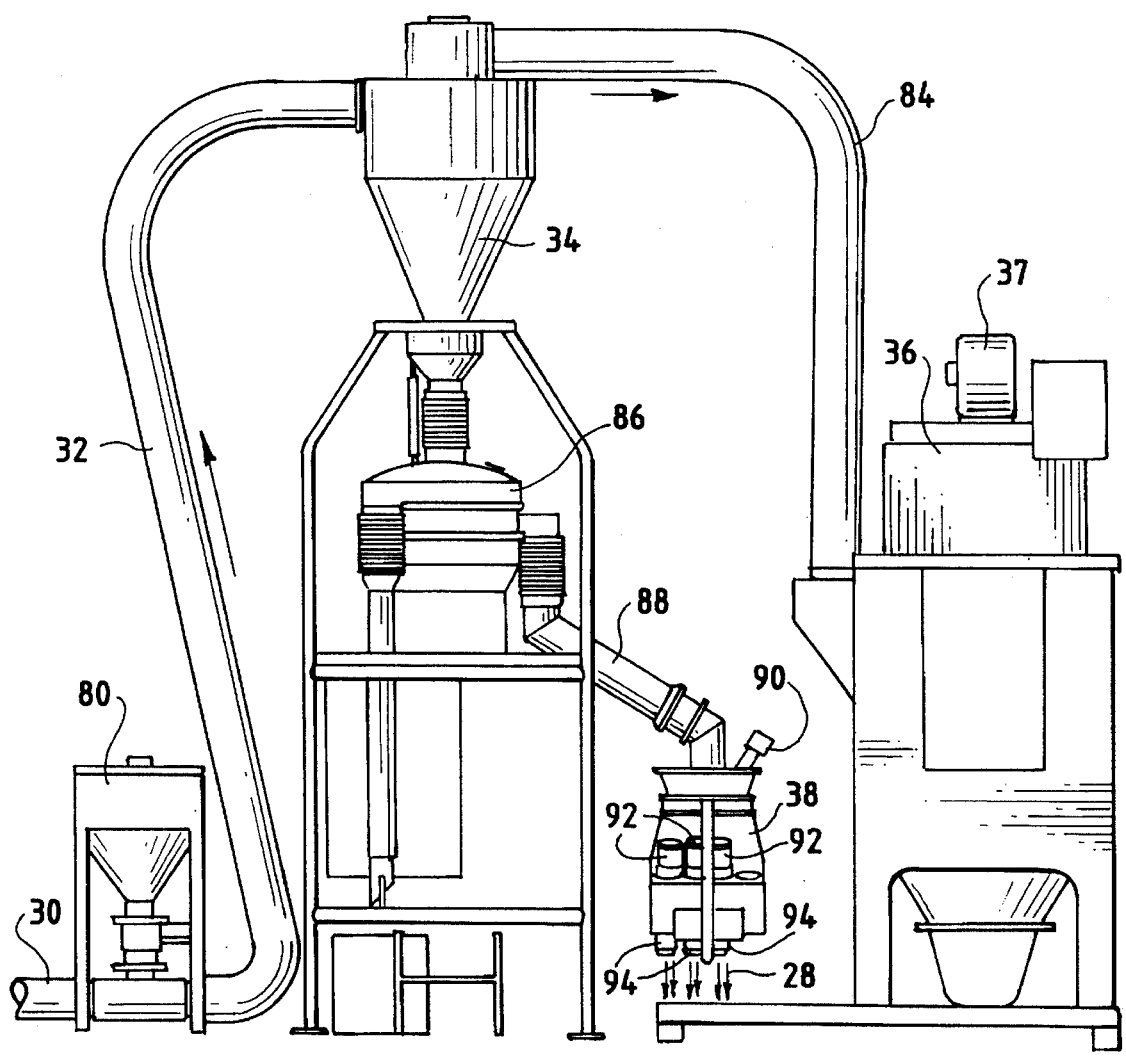
FIG. 5 is the reclaimer, shot feed supply, classifier and dust collector components of the shot handling system for the machine in FIG. 1.

After the surfaces 56, 58 of the plate 42 are blasted, the spent shot falls and is collected at the bottom of the blast cabinet 4. The spent shot is removed through the outlet pipe manifold 30 and drawn through the air and shot collection hose 32 by suction created by a blower 37 in the dust collector 36. The recycling and shot feed system may be seen better in FIG. 5. The air and shot collection manifold outlet 30 from the blast cabinet base is connected to an automatic shot refill hopper 80, which is in turn connected to the air and shot collection hose 32 return line, which transports new shot as required from the automatic refill hopper 80, along with the spent shot, to the cyclone reclaimer 34. The cyclone reclaimer 34 separates out dust and fine shot fragments produced by shot breakage. This waste is removed and sent to the dust collector 36 via a dust exhaust hose 84.

The remaining shot is preferably filtered by a classifier 86 which uses a series of vibrating screens to separate out oversized shot and broken shot pieces into waste bins. The remaining good shot is then sent by a pipe 88 to the shot feed hopper 38. Various numbers of screens and sieve size combinations can be utilized depending on the shot grade mix used. Alternately, the classifier 86 section of the shot recirculation system may be bypassed if so desired, and the spent shot in the system periodically disposed of or screened and good shot recovered external to the system by other means. The above devices for recycling and sorting shot may be replaced by other methods and devices which perform the same function of ensuring continued use of good quality shot.

The shot feed hopper 38 has a level probe 90 which senses the level of shot in the system. If the shot level falls below a preset point, a control signal is sent to the automatic refill hopper 80, actuating a valve to add more shot to the collection hose 32. At the bottom of the shot feed hopper 38 directly below three isolation cylinders 92 are three pairs (six total) of shot feed orifice tees 94. Each orifice tee 94 feeds shot to a separate blast gun, with each of the three cylinders 92 mounted on the shot hopper 38 capable of isolating a pair of two blast guns. The six shot feed hoses 28 are attached to the six feed tees 94, and shot is transmitted to the guns 64, 66, 68, 74, 76, 78 as described above. The blast gun shot flow rates and feed hopper shot level may be monitored by lowering the isolation cylinders 92.

Figure 6:
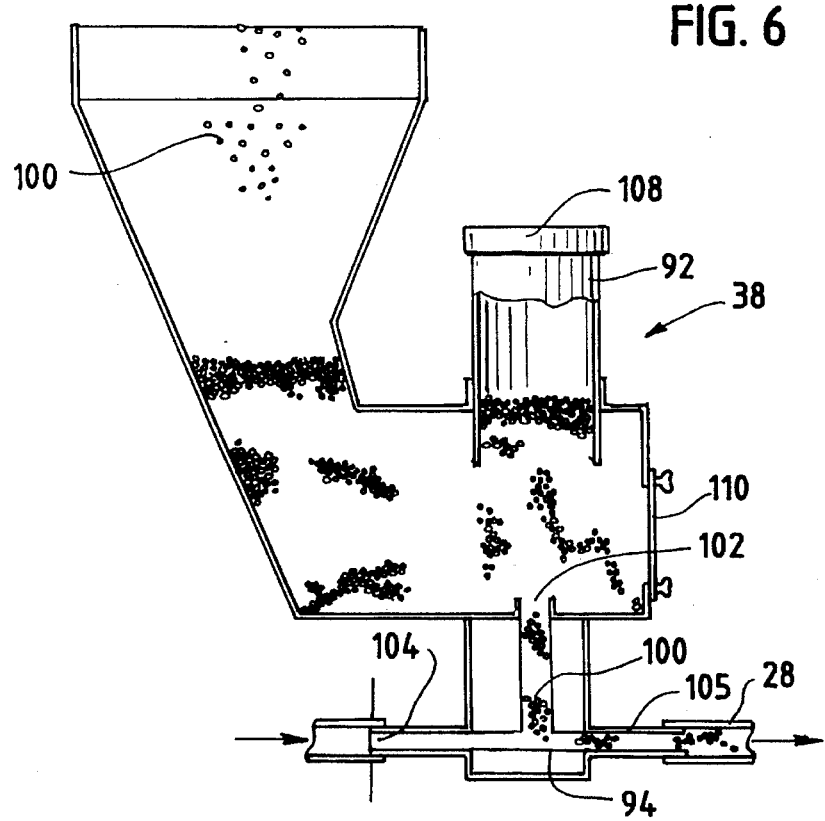
FIG. 6 is a cross sectional view of the shot feed hopper of the shot handling system of FIG. 5.

FIG. 6 is a cross sectional view of the shot feed hopper 38 and one of the isolation cylinders 92 and orifice tees 94 used to feed shot to the guns. The shot 100 falls from the reclaimer 34, through the classifier 86 to the base of the shot hopper 38. The shot then is drawn into one of the six feed tees 94 through an orifice 102 by suction generated at the guns 64, 66, 68, 74, 76, 78. An orifice plate 104, which has a hole drilled in it, is installed on the opposite end of the feed tee 94 from the outlet 105 to which the feed hose 28 is attached.

The orifice plate 104 is used to restrict and control the amount of air wash and optimize the rate of shot feed flow to the guns. For example, for optimal balance of the gun types described below, a 5/32 inch diameter orifice 104 on each tee 94 results in a shot flow rate of about 3 kg/min per gun. Alternately, a common air wash manifold (not shown) can be connected to all of the feed tee 94 air inlets instead of individual orifice plates 104 to insure identical air wash and shot flow to each gun. With such a manifold, air wash and shot flow rates can be adjusted, e.g. by a needle valve, to compensate for various gun compressed air operating pressures.

The shot flow to each pair of opposed blast guns may be isolated while the shot peening operation is ongoing by means of lowering the cylinder 92. A removable cap 108 allows an operator to observe the shot flow to the particular feed tee 94. If a blockage occurs, the operator may clear it through the cylinder 92. A removable plate 110 is also provided on the side of the feed hopper 38 for access to the chamber for maintenance or other adjustments.

Figure 7:
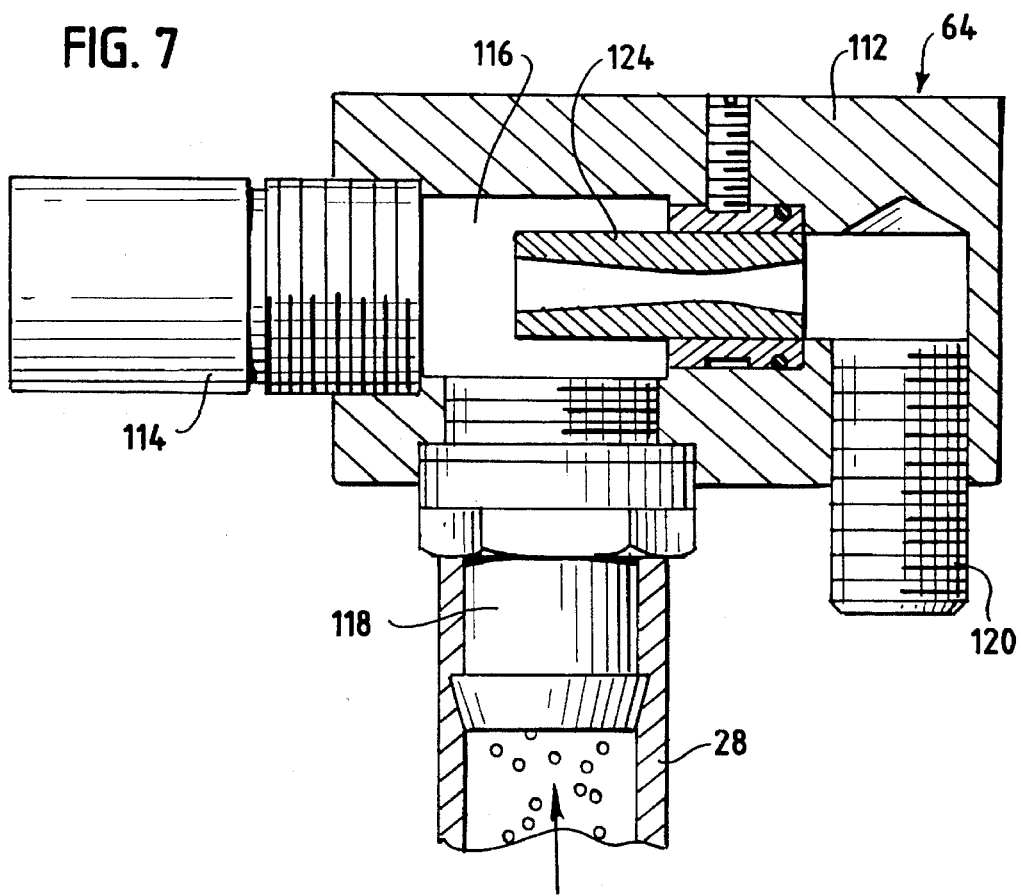
FIG. 7 is a cross sectional view of one of the vacuum-type compressed air blast guns shown mounted in FIG. 4.

Each feed tee 94 outlet 105 is attached to a feed hose 28, which is in turn attached to one of the compressed air guns. A cross section of the preferred compressed air gun 64 is shown in FIG. 7. The compressed air gun 64 has a gun body 112 and a nozzle 114 for emitting shot. The shot is sucked from the feed hose 28 through a hose adapter 118 into a chamber 116. Compressed air from a compressed air regulator is fed through an air hose fitting 120 into the gun 64 and through the air injector 124 port. The flow of compressed air through the injector 124 creates a vacuum in the chamber 116 by a venturi effect. This vacuum sucks and meters shot from the shot hopper 38 through the feed hose 28 into the chamber 116. The compressed air from the injector 124 then propels the shot in the chamber 116 out the nozzle 114 at high velocity to impinge upon and blast the plate surface 56.

The above described shot circulation system involves two opposed vacuum systems. The primary vacuum is generated by the venturi effect from the high volume of compressed air which supplies the guns 64, 66, 68, 74, 76, 78. For example, the guns in the preferred embodiment each have a rated air flow of 36 c.f.m. A common air pressure regulator and manifold supplies all of the guns. The velocity of the shot can thus be controlled by the regulator, where lowering the air pressure reduces the suction and shot fed to the guns, and also results in a lower propulsion of the shot and impact velocity on the plate.

To adjust for small air supply pressure fluctuations from the air compressor and downstream accumulator, a pilot feedback regulator is fitted to the main compressed air regulator. The feedback regulator senses fluctuations in pressure on the downstream side of the system and adjusts the main regulator accordingly. In this manner, a constant dampened air pressure supply to the guns is achieved.

Of course, other types of blasting equipment for shot peening may be used for the method of the present invention. The vacuum-type compressed air blast gun system as described above may be replaced if the use of denser or larger shot grades or higher velocities are desired. For example, a "pressure pot" type air blast system, where the compressed air is directly connected to the shot feed hopper, which then feeds the shot via hoses to unconstricted blast guns may be used for greater force. Blasting may also be accomplished by a centrifugal wheel or slinger machine having a vaned or bladed wheel attached to a motor to propel the shot. Also, different numbers of blast guns in different arrangements may be utilized.

Importantly, it has been found that circulating ceramic shot generates several hundred thousand volts of static electricity which must be dissipated or the shot will tend to agglomerate and behave like wet sand, blocking the shot recirculation system and flow to the guns. An extensive grounding system is therefore required for all isolated components of the above machine. For example, even the plate rail 22 is grounded using a spring loaded carbon motor brush for positive contact while it is moving, since a static charge may accumulate on the rail and lower portion of the plate to which excessive shot will then adhere.

Figure 8:
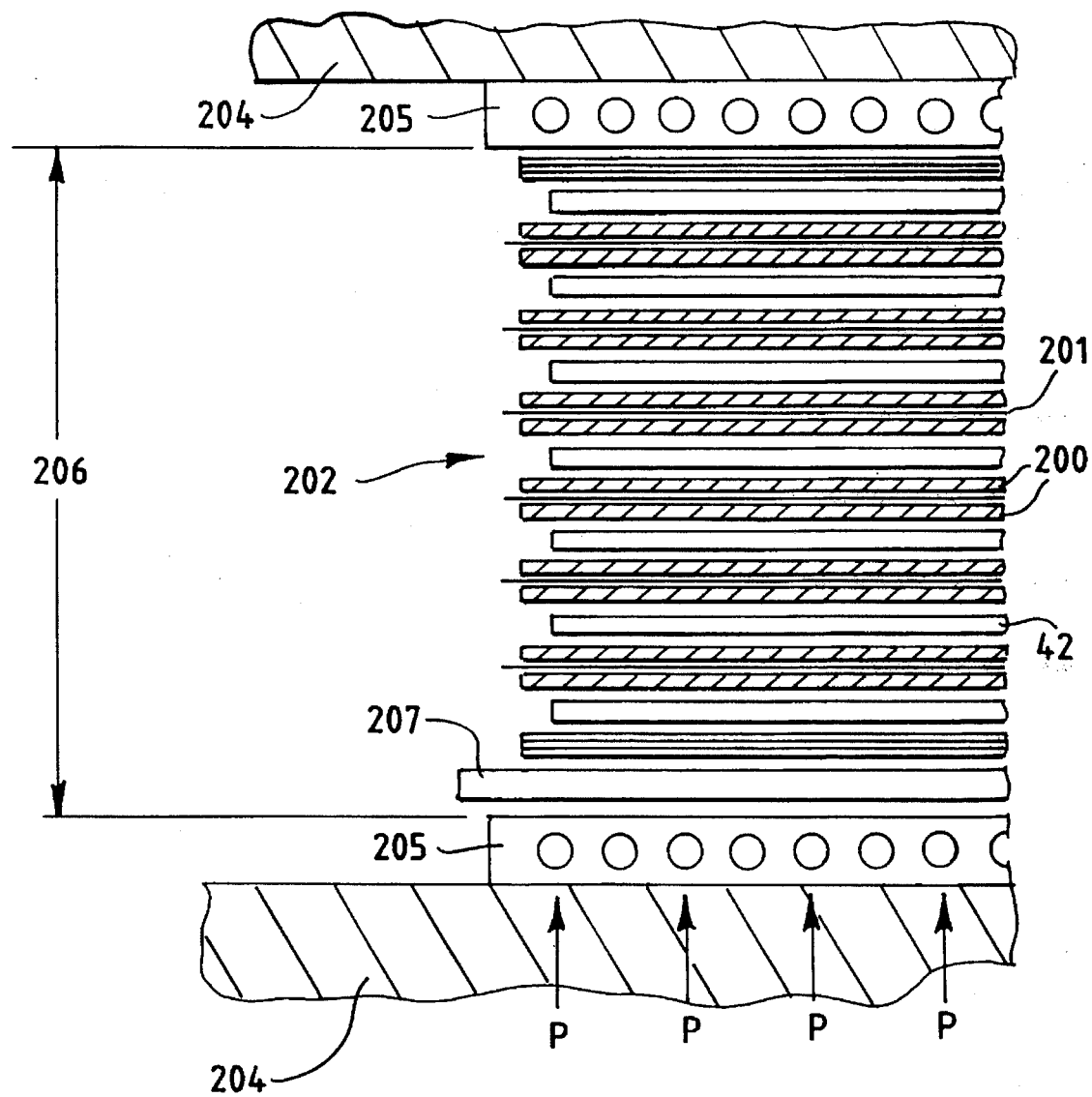
FIG. 8 is a side view of a daylight opening of a hydraulic laminating press containing a pack of laminates interleaved with press plates obtained in accordance with the present invention.

In most high pressure decorative laminate commercial applications, the press plates 42 are interleaved between successive layers of thermosetting resin treated laminate materials 200, separator sheets 201, and press plates 42 in separate back to back laminate assemblies or doublets, as shown in FIG. 8, permitting the production of a plurality of laminate sheets in one pressing operation. As noted above, the textured press plates are used in direct contact with composites of resin treated paper sheets placed therebetween, with the decorative surface sheets facing the plates and backed by filler sheets facing each other. Multiple layers of laminate materials 200 and press plates 42 form "packs" 202, supported and transported on carrier trays 207, which are then loaded into a press 204 with multiple openings 206 for curing and pressure treatment between heating/cooling platens 205. Note that as the clearance for material movement into the press 204 is limited by the press opening 206, it is apparent from FIG. 8 that warpage or curvature of press plates 42 can interfere with the ability to move the pack 202 into the press 204.

Another form of decorative laminate is low pressure faced board, in which thermosetting resin treated decorative papers are fused and bonded directly onto one or both sides of substrates such as particleboard or medium density fiberboard. Most commonly, a single board is laminated between two press plates 42. The pressing operation occurs within a press 204 with a single opening 206 and two isothermal heating platens 205 using relatively low pressure and a very short press cycle time compared to the high pressure decorative laminate process. The details of the composition, construction and processing methods for each type of product, i.e. high pressure decorative laminate and low pressure faced board, will be well known to those skilled in the art.

GENERAL EXAMPLES

As a baseline example, using a vacuum-type compressed air shot peening machine of the same design as described in detail above, a large, 4×10 foot production size press plate 42, polished to a #7 finish, was shot peened with a 50:50 mixture of "large" diameter Grade B20 (essentially 600–850 µm (0.024–0.033 inch)) and "medium" diameter Grade B30 (essentially 425–600 µm (0.017–0.024 inch)) S.E.P.R. Zirblast® ceramic shot. (It should be apparent to those skilled in the art that specifying a range of diameters for any particular grade of shot will, of course, possibly include a very small number of individual shot particles having diameters outside of the recited range of diameters, where the recited range is typically of a normal diameter distribution. The recitation of diameter sizes as used herein and for establishing a particular shot grade, however, has been found by the industry to represent a meaningful method of categorizing ranges of shot sizes for a number of purposes.

After several passes at maximum blast gun pressure and a relatively slow 3–4 inch/min plate traversing speed, about only 75% of the surface area of the press plate had been covered by peening, with little evidence of further measurable improvement possible. As such, the surface finish was considered unacceptable because of the distinct sparkle appearance.

The plate was subsequently overblasted with "small" diameter Grade B60 (essentially 125–250 μm (0.005–0.010 inch)) ceramic shot, which eliminated the shiny islands and resulted in a desirable uniform gloss and visual surface aspect.

In contrast, using the same equipment, an identical press plate 42 prepared in accordance with the present invention was simultaneously peened with a tertiary mixture of shot in the ratio 37.5 percent B20, 37.5 percent B30, and 25 percent B60 S.E.P.R. Zirblast® ceramic shot (i.e., 75% medium to large size shot and 25% small shot). As noted above, the large to medium shot grades provide a textured finish while a small shot grade is utilized to achieve essentially complete overall coverage (saturation) and the desired plate gloss level. After only a few passes, the plate was satisfactorily textured by the larger shot grade mix and at the same time exhibited a desirable uniform gloss appearance.

In fact, while both plates looked quite similar in structure and overall appearance and exhibited no objectionable residue from the peening operation, the plate using the present invention was obtained with fewer passes. Both plates were subsequently used (without any post-treatment such as electropolishing or chrome plating) to press full size sheets of solid color laminates. Both plates exhibited excellent release from the laminates upon separation with no evidence of picking (traces of laminate surface resin and paper fibers remaining adhered to the plate) or physical sticking of the plate and laminate together. The laminate finish was independently judged to be surprisingly similar in appearance to the conventional suede finish produced with LC-55 release/texturing paper supplied by Ivex Inc. (formerly L&CP Inc.), which is widely used in the U.S. laminating industry.

Simultaneous mixed texturing and overblasting offers advantages over the separate discrete processes of texturing and overblasting by reducing the number of passes required to satisfactorily process a plate (here, by at least one pass). Further, it eliminates the need for time consuming changeovers of the peening machine from one grade of shot to another and back again, or the expensive option of dedicating equipment to each shot grade used in the process.

Specific Examples

A series of plate texturing shot peening trials were conducted to demonstrate the utility and versatility of simultaneous mixed shot grade texturing and overblasting, rather than the use of discrete texturing and overblasting steps as taught in the prior art. The various shot grade mixtures tested are shown in Table I. All of the trials used a binary mixture of relatively large and medium size shot grades, to which was added a proportion of a small shot grade when simultaneous overblasting was practiced.

Examples #1 and #7 used ceramic shot and a second, discreet overblast step to achieve acceptable peening coverage in a manner similar to that taught in the prior art and the first general example noted above.

Examples #11 and #13 are similar, except cast steel shot was used to simulate the texturing process taught by the prior art. Again, however, a mixture of large and medium shot grades rather than a single large shot grade was used. These examples illustrate the limited coverage obtained when attempting to generate a relatively rough texture without employing some form of overblasting (whether simultaneous or separate) to achieve adequate coverage and obliterate the residual myriad unpeened shiny "islands" which result in a generally commercially unacceptable sparkle or mottled appearance. The use of binary mixtures of relatively large and medium shot grades were chosen for the plate texturing trials described herein, rather than individual shot grades as practiced by the prior art, to obtain a more diverse or "blended" peened appearance considered more aesthetically attractive.

The ceramic shot used in these examples were various grades of Zirblast® fused ceramic beads, produced by Societe Europeenne des Produits Refractaires in France and sold by their subsidiary S.E.P.R. Ceramic Beads and Powders in the United States. The shot is essentially spherical, has high impact resistance and a low breakage rate, and is almost entirely free of metallic or iron oxide contamination. S.E.P.R.'s Zirshot®, a still more highly refined (and expensive) range of ceramic beads, is also useful in the practice of this invention. Both types of shot have a typical composition of about 67% Zirconia ($ZrO_2$) and a 33% glassy phase (comprised of 30% $SiO_2$ and 3% impurities). It should be understood that other ceramic shot compositions and grades from other suppliers might be available and are considered within the scope of the present invention. The cast steel shot used in these examples, with a typical hardness of Rockwell C 40–50, is a widely used peening medium and is readily available from many suppliers.

The blasting or peening machine used for these trials was a Matrasur Model PHF03-60 pressure-pot type compressed air blasting machine, more powerful than disclosed above, but on a much smaller scale suitable only for laboratory testing (i.e., 10×10 cm. samples were used in the trials). All operating conditions were held constant during this trial, with the exception of air pressure as noted in Table I. The combination of conditions set, including a gun air pressure of 1.5 kg/cm$^2$, simulates reasonably well the peening intensity and coverage rate obtained with the full-scale, vacuum-type air-blast peening equipment disclosed above and used to process full size press plates according to the preferred practice of this invention.

Since the trial apparatus is not suited to dual side blasting, being equipped with only a single blast gun, asymmetric blasting of one side of each plate sample occurred. As expected, unbalanced compressive stresses resulted in the plates having a curvature which otherwise would be a major problem with large, thin production size press plates. However, for small plate samples, the equipment is convenient to use while obtaining generally reproducible results. The plate samples in the examples shown in Table I all exhibited convex warpage of the peened face with about a 1.0–2.5 mm. corner deflection.

The press plate samples peened and textured as recited in the Table series were all A.I.S.I. 410 alloy stainless steel, with a hardness of 38–45 on the Rockwell C scale. To prepare the samples, a full-size production plate was first ground (commonly referred to as abrasive belt polishing) on a flexible flat-bed grinding machine using a series of belts of decreasing grit size (from course 180 grit down to fine 320 grit), with cutting oil as lubrication, to remove deep scratches and other imperfections. The plate was then processed on a flat-bed cutting buff, using a hard buffing mop with a relatively aggressive cutting rouge (i.e., a buffing compound consisting primarily of alumina abrasive grit blended with animal based greases and fats) to remove residual grinding marks. Finally, the plate was color buffed with a soft "floppy" mop and fine rouge to a lustrous, scratch-free condition referred to in the art as a #8 mirror finish. The 10×10 cm. samples used for the trials were each cut from this plate. Thus, each sample was essentially identical to the others, the only variable being the shot grade mixtures used in the trials, and in a few special cases, the gun pressure selected.

It should be apparent to those versed in the art that less exacting finishes than the "commercial" quality #8 mirror finish described herein are also suitable for shot peen texturing by the method of this invention, since the peening process itself obliterates and masks certain minor defects (which would otherwise be objectionable in a polished plate were it used as such to produce glossy finish product), and uniformly dulls the plate surface anyway. Thus, plates with lesser quality finishes requiring less stringent color buffing, and resultant gloss and reflectivity standards (e.g., finishes commonly designated #6 and #7 in the art), and therefore less preparation effort, can also be used with the method of this invention. High gloss #8 finish plate samples were used for the trials summarized in Table I to facilitate judging the resultant peening coverage obtained.

All of the trials conducted using the process of this invention (except Examples #1, #7, #11 and #13 as controls) used a binary mixture of relatively large and medium "texturing shot" grades to obtain a perceptible texture roughness, with a single shot grade of much smaller "overblasting shot" to achieve the requisite peening coverage and finish uniformity, in a combined single blasting operation. These examples are not to be construed as restrictive in terms of the shot grade mixtures within the scope of this invention. For example, use of a tertiary mixture of texturing shot grades in conjunction with an overblasting shot grade, such as 25% B16 (essentially 850–1180 μm (0.034–0.047 inch)), 25% B20, 25% B30, and 25% B60 is also possible. Likewise, a single texturing shot grade, in combination with an overblasting shot grade (e.g., 75% B20 and 25% B125 (essentially 5–125 μm (0.0002–0.005 inch))) can also be used, as well as a binary mixture of overblasting shot grades.

Many combinations of various shot size grades offer the benefits of the present invention. Overblasting shot grades are by definition significantly smaller than texturing shot grades, and herein are arbitrarily defined as essentially having a diameter of 250 μm or less. Conversely, relatively large texturing shot grades are herein arbitrarily defined as essentially having a diameter of 425 μm or greater, although it should not be construed that shot with diameters in the range 250–425 μm would not be useful. Texturing shot should comprise the majority of the shot grade mixture, preferably at least 60%.

The texturing shot grades used in the examples of Table I were limited to size distributions essentially with a diameter of 1000 μm (1.0 mm) or less. This should not be construed as restrictive, but only as practically illustrative. First, these shot grades as used in the examples are the most popular shot grades used commercially. Second, the density and size of shot that can be practically used (i.e., transported and propelled) is limited by the type of blasting equipment employed for these trials.

Vacuum-type air-blast machines, as described in detail herein, are the least powerful and are the most limited in shot mass transport or "throw rate," such that ceramic shot sizes essentially over about 800 μm or any size steel shot present difficulties.

Pressure-type air-blast machines similar to the Matrasur equipment used for these trials, are significantly more powerful with greater shot mass transport capabilities. Ceramic shot sizes essentially up to about 1000 μm can be used with good results, as can smaller grades of denser steel shot. The mass transport limitations of air-blast peening machines in general (i.e., their inability to convey and propel a sufficient quantity of large shot grades, particularly denser steel shot, at a sufficient rate to achieve the desired peening coverage) dictate the types of shot that can be used, and thereby controls the range of textures that can be produced by peening and overblasting with these types of machines. At any given mass transport rate (i.e., the mass per unit time of shot expended), coverage rate is inversely proportional to the density (linear function) and diameter (cubic function) of the shot used. The larger and denser the shot is, the less individual particle impacts (coverage) per unit time results.

The third variety of blasting machine in common use are the centrifugal wheel type, which mechanically "sling" the shot at the target. These machines are capable of propelling a very large volume of shot. Therefore, while air-blast machines can generally accelerate shot to greater velocities than can "slinger" wheel machines (although with shot size and density limitations), the mechanical "slinging" operations have much greater mass transport capability and can easily handle large steel shot grades (with the size of the wheel and motor being practical considerations). Steel shot is most commonly used with this type of machine, with shot diameters often exceeding 1000 μm (1.0 mm), and up to 2000 μm (2.0 mm) diameter or greater. Thus, the type and sizes of shot used for texturing shot mixtures is limited only by the capabilities of the blasting equipment available to the practitioner.

However, ceramic shot, and specifically ceramic shot grade mixtures essentially having diameters less than nominally 1000 μm (1.0 mm), are preferred because of the finer textures achieved, non-contamination of the peened press plates, and ease of handling of the shot, which allows simpler, less expensive, lower maintenance blasting equipment to be used.

The overall finish of a peened press plate and the laminate subsequently produced from it, to be aesthetically and commercially acceptable, is established by its visual appearance (i.e., its surface texture or structure, gloss, and overall uniformity). The texture can be described quantitatively by its roughness and peak count, while gloss and uniformity are partially a function of the peening coverage achieved. The smaller the shot grade and the lower its density, the greater the equipment mass transport capability, and the longer the exposure time (i.e., the slower the plate traverses past the blast gun or multiple guns), the greater will be the coverage during a single peening pass.

The percent of coverage obtained, as shown in Table I for each trial, may be visually determined against pre-established reference standards. For very exacting peening applications, several quantitative techniques have been developed, such as the Straub projection, Peenscan ultraviolet light sensitive dye, Valentine grain growth metallographic examination, and Almen strip arc methods. All are relatively difficult and tedious to perform. Therefore, visual inspection is most often employed in the art, and was used during the trials described herein. The visual, qualitative method to determine peening coverage of press plates is quite adequate, since mechanical property enhancement of press plates, such as improved fatigue strength or stress corrosion resistance, is of little interest with press plates.

The relationship of the percentage of coverage obtained after peening, and the number of processing passes used, can be expressed by the equation:

$$C_n = 1 - (1 - C_1)^n$$

where $C_1$ is the percentage of coverage after one pass (expressed as a decimal), $C_n$ is the percentage of coverage after n passes (expressed as a decimal), and n is the number of passes. By visually determining the percentage of coverage after several (n) passes, the percentage of coverage per pass ($C_1$) can easily be calculated by the rearranged equation:

$$C_1 = 1 - \sqrt[n]{1 - C_n}$$

and the number of passes necessary to obtain any final degree of coverage ($C_n$) desired can then be extrapolated by the equation:

$$n = \log(1-C_n)/\log(1-C_1)$$

This relationship shows that 100% theoretical peening coverage is only reached asymptotically, although in practical terms, visual inspection can discern "100%" coverage as the absence of any obvious unpeened areas or islands on the surface of the processed workpiece. Since in practice even the most precise quantitative analytical methods cannot accurately measure peening coverages above 98%, this value has been arbitrarily established by the art as defining full coverage or saturation peening.

For mechanical applications, it is extremely important to obtain saturation coverage if the property enhancements sought are to be realized. However, when considering the cosmetic qualities of press plates, and the decorative laminates produced therefrom, lesser degrees of coverage are often acceptable. It is generally accepted in the industry that 95% coverage or better produces an essentially uniform and sparkle-free press plate finish appearance, although for some applications, less coverage may be considered appropriate. For the peening trials summarized in Table I, at least 95% coverage was considered optimal to produce a plate and laminate finish aesthetically pleasing for most commercial applications.

Another quantifiable plate surface feature, gloss level, is usually measured with a 60° gloss meter, of which many makes and models are readily available, and all of which generally work on the same principle. A beam of calibrated intensity light is projected onto the surface of the plate at an angle 60° to normal of the plate surface (i.e., an incidence angle of 30° from the plane of the plate surface). Geometrically opposite to the light source is a photodetector device which measures the intensity of the light beam reflected from the plate, which is then transposed by the meter into a gloss value (either in analogue or digital form).

The gloss meter is initially calibrated against a high gloss black tile standard with a known gloss value (usually 94±1 gloss units or degrees) supplied with the meter. By convention in the United States, per NEMA standards which regulate the high pressure decorative laminate industry, and specifically NEMA Test Method LD3.13.1 (1991) prescribing the procedure for measuring gloss, for historical reasons the meter is arbitrarily (falsely) calibrated to an 82 gloss unit reading against the black tile primary working standard.

However, for the gloss measurements made for the plate finishes produced during the peening trials summarized in Table I, the more universally used and increasingly accepted industry-wide ISO (International Standards Organization) method was employed, in which the gloss meter was calibrated to agree precisely with the gloss value of the black tile standard. It must be understood by those skilled in the art that several factors influence the relative gloss of a plate finish, the most important of which are the microtexture (degree of polish) and macrotexture (structure) of the surface, which have confounding effects on the gloss level measured by a meter.

Except for a perfect mirror finish, some quantity of light intensity is lost from the meter's light source through reflection to the photodetector because of light scattering caused by non-planer irregularities on the plate surface. The irregularities are present on a nanometer (nm) scale with respect to a plate surface's "microfinish" as well as on a micron (μm) or even millimeter (mm) scale when related to a plate texture structure's roughness and topography (i.e., peaks and valleys, or in the case of a peened plate surface, ridges and craters, respectively). All of these disruptions scatter some amount of light and reduce the perceived gloss level of the finish, both instrumentally and visually, although both "measurements" are not necessarily always in total agreement. In general, the greater the microtexture and macrotexture of the surface finish, the more light will be scattered and the lower will be its gloss level.

Another confounding factor is the effect of surface gloss uniformity as related to the degree of coverage of the peened plates of this invention. The plate finish, prior to peening, is essentially a planar surface, which due to polishing and buffing, has a relatively smooth microtexture and glossy appearance. The subsequent impact of the shot particles during peening disrupts the planarity of the plate surface by creating myriad impact craters, providing the macrotexture as well as a more subtle microtexture resulting from embossing of the shot's finish itself into the plate surface. In general, the greater the peening coverage and intensity, the rougher the texture will be and the lower the gloss level will become. The gloss level obtained is also influenced by the type of shot used, in terms of its smoothness, sphericity and size. With less than complete peening coverage, residual unpeened, flat and relatively high gloss areas or "islands" will remain interspersed within the overall peened texture. If these islands cover an appreciable percentage of the surface area of a peened plate (i.e., more than 5% of the total area, corresponding to less than 95% coverage), a generally less desirable non-uniform gloss, sparkle appearance may be perceived.

However, a typical gloss meter measures a relatively large area of a plate surface, with a beam focus of about 1 cm. diameter, and as such only senses the aggregate or average gloss or reflectance of the dull peened areas and shiny unpeened islands. Therefore, while gloss can be quantified, it is important to understand that there are many interactive factors influencing the values measured which are not easily separated.

Finally, the macrotexture can be quantified in terms of the elevation and depth of the peaks and valleys, and their frequency, commonly referred to as the texture's roughness and peak count, respectively. A profilometer determines these parameters, in which a very sensitive stylus traces the topography of the surface structure and converts the profile geometry into electronic signals from which roughness values and peak count can be calculated by defined equation algorithms.

The instrument used to measure the roughness and peak count values reported in Table I was a Perthometer Model M4P. All measurements were made using a 15 mm. trace length, with a 2.5 mm. cut-off, such that signals from the first 1.25 mm. of the trace and the last 1.25 mm. of the trace are ignored, and only the middle 12.5 mm section is considered in the measurement. Additionally, for peak count determinations, a slice setting of 0.5 μm was used, which is the total distance about the mean roughness between the upper and lower slice thresholds, above or below which peaks and following valleys that extend are measured and considered significant profile deviations. Roughness and peak count are interrelated, and are affected by the shot grade and peening intensity used, as well as the coverage achieved.

For textured press plates, the most descriptive and useful roughness parameters are considered to be Ra and Rz. Ra, the average arithmetic roughness (in the past often denoted AA), is the arithmetic mean of all deviations of the roughness profile along the total 12.5 mm. measuring length. Rz, the average roughness depth, is the mean of the individual roughness depths in five successive individual 2.5 mm. measuring lengths comprising the total 12.5 mm. measuring length, where each roughness depth is determined as the vertical distance between the highest and lowest points of the roughness profile within each segment. Peak count is simply a measure of the number of peaks (followed by their successive valleys) that together extend above and below the predetermined slice threshold of ±0.25 µm about the roughness profile mean value respectively. While these parameters are useful in quantifying a plate texture's structure, and meaningful conclusions can often be made based on them, like gloss measurements, they do not in themselves completely define the overall visual aspect of a plate finish.

The peened textured plates produced by the method of this invention, whose properties are described in Table I, can be generally described as "average" in terms of their roughness compared to the prevalent commercially available laminate finishes popular in the marketplace. The peened finishes of these examples generally have an average roughness (Ra) in the range 1.0–2.5 µm and roughness depths (Rz) in the range of 8.0–15.0 µm. Table II shows a comparison of this type of finish and the other major finishes that are commonly produced by the high pressure decorative laminate industry today.

TABLE II

| Plate Finish | Generic Name | Finishing Method | Typical Roughness (µm) | |
|---|---|---|---|---|
| | | | Ra | Rz |
| A | Glossy (Lacquer) | Buffing | 0.02–0.05 | 0.2–0.8 |
| B | Matte (Satin) | Shotblasting | 0.2–0.5 | 1.0–3.0 |
| C | Peened* | Shotblasting | 1.0–2.5 | 8.0–15.0 |
| D | Suede* | Chemical Etching or Shotblasting | 2.0–4.0 | 15.0–30.0 |
| E | Deep Texture (Dimensional) | Peening, Etching, Machining, or Sculpturing | >5 | >30 |

*Produced by the method of the present invention.

Type A "glossy" finish is produced by the methods previously described for preparation of the #8 mirror finish press plate used in the peening trials summarized in Table I, and is the smoothest of the finishes produced.

Type B "matte" finish has a low gloss (i.e., dull or matte appearance) and is essentially planar with no apparent visual macrotexture. It is produced by blasting a Type A finish plate with very fine glass beads or grit materials such as sand or alumina. Glass beads in the range 70–110 µm are commonly used, which readily shatter upon impact with the plate surface such that, with recirculation, the plate surface is essentially being microtextured with fine, sharply fragmented glass powder. This finish has become popular as a replacement for the older "dull rubbed" finish, in which the surface of a glossy finish laminate after pressing is subsequently abraded by the action of brushes and a slurry containing abrasive material to reduce its overall gloss level.

The Type D "suede" finish is most commonly produced by a chemical etching process, although moderately powerful, centrifugal wheel type blasting machines and relatively large shot grades can be used to produce finishes with such roughnesses.

Finally, a Type E finish with a deep exaggerated texture can be produced by either prolonged, controlled chemical etching or excessive shot peening with powerful, centrifugal wheel machines and large steel shot grades. Machining or sculpturing of plate "masters" with deep textured designs are other techniques commonly used. It should be recognized by those skilled in the art that press plates with more pronounced textures of the Type D and Type E finishes may have to be further processed after primary texturing with electropolishing to deburr and smooth the surface, or additionally, chrome plating to further improve the releasability of the plate from the laminate face during separation after pressing and curing has taken place. While electropolishing and/or chrome plating of Type C plates of this invention is not necessary for acceptable release properties, they may optionally be so treated to further refine the finish, enhance releasibility, or improve wear resistance.

The press plate shot peening, simultaneous texturing and overblasting trials summarized in Table I were conducted with various mixtures of commercially available grades of either ceramic or cast steel shot. It was attempted to match the size distributions of the various ceramic and steel shot grades as closely as possible, and sizes for both were restricted to those grades of shot essentially 1000 µm diameter or less, because of limitations in the mass transport capability of the blasting equipment used. All the examples used a binary mixture of large and medium texturing shot grades.

EXAMPLES 1 AND 1A

Examples #1 and #1A is similar to the prior art process, except that a mixture of large and medium shot grades, in lieu of a single large shot grade, was used to generate the plate macrotexture. After four passes, 90% coverage was achieved. Applying the general coverage equation previously discussed, extrapolation indicates that six passes would be required to obtain the minimum acceptable 95% coverage, and an additional pass (7 total) would be necessary to reach 98% coverage or saturation. After the initial four passes with larger shot grades, the plate was overblasted with a small shot grade, resulting in full peening coverage and a very uniform, pleasing plate appearance.

EXAMPLES 2, 3, AND 4

Examples #2, #3 and #4 were conducted in accordance with the present invention and employed the same mixture of large and medium ceramic shot grades as Example #1, to which was added decreasing quantities of the same overblasting small ceramic shot grade as Example #1A to simultaneously overblast the plate samples while texturing them. As can be seen, even with the least amount of overblast shot grade of Example #4, 95% coverage was obtained in only four passes. With the greatest percentage of overblasting shot grade (Example #2), 100% visual coverage was achieved in four passes, rather than the seven passes which would otherwise be needed without overblasting.

EXAMPLES 5 AND 6

Examples #5 and #6 used the same large and medium ceramic shot grade mixture as the preceding examples, but was combined with even a smaller grade of overblasting ceramic shot. In both trials, essentially 100% coverage was obtained in only three passes, compared to the four passes needed to obtain 95% coverage with the larger overblast shot grade used in comparative Examples #3 and #4.

EXAMPLES 7 AND 7A

Example #7 and #7A again represents a modification of the prior art, using a binary mixture of texturing shot grades with an even wider range of large and medium shot grades than in Example #1 and #1A, followed by the same discrete, secondary overblasting step. Prior to overblasting, the plate exhibited 90% coverage after five passes. The lower coverage rate compared to Example #1 (five passes versus four passes) is attributable to the presence of larger particles. Since the blasting equipment transports a given mass of shot at a constant rate regardless of shot grade, larger shot grades provide fewer individual particles to propel against the plate per unit time or pass. Hence, a poorer coverage rate results. The general coverage equation indicates that for the large shot grade mixture used in Example #7, seven passes would be required to obtain the minimum acceptable 95% coverage level, and nine passes would be needed to achieve saturation or 98% coverage.

EXAMPLES 8 AND 10

Examples #8 and #10 used the same mixture of large and medium ceramic texturing shot grades as did Example #7, to which was added two different grades of smaller ceramic overblasting shot in accordance with the present invention. A 100% visual coverage level was obtained with the larger (B60) overblast shot grade in four passes, while 100% coverage resulted in only three passes when the smaller (i.e., B125) overblast shot grade was used (as was the case with Example #5).

EXAMPLE 9

Example #9 used the largest overall ceramic texturing shot grade distribution with B60 shot for the simultaneous overblasting. Again, 100% coverage was achieved in only four passes. The slightly higher roughness and lower gloss compared to Examples #8 and #10 is consistent with the use of the larger shot grade mix and absence of intermediate size B30 texturing shot grade.

Overblasting, whether simultaneous or discrete, has a slight smoothing effect on the plate texture, wherein the near saturation or saturation coverage of the small shot can flatten and smooth the large shot crater rims to some extent. This effect is reflected in a decrease in the plate texture's average roughness (Ra) and gloss level as illustrated when the plates of Examples #1 and #7 are discretely overblasted, where resultant Ra values are very similar to those for all the other ceramic shot simultaneously overblasted plates, with the exceptions of Example #4, where the least amount of overblasting shot was used, and Example #9, where the largest size texturing shot distribution was used.

All the gloss values were quite similar after overblasting, with the exception of Example #3, which appears to be an anomalous reading.

EXAMPLES 11–16

Trials were also conducted with cast steel shot of comparable grades to the ceramic shot used in the previous examples. Using identical blasting machine conditions as with the ceramic shot trials, Examples #11 versus #12 and Examples #13 versus #14 illustrate the relative benefits of simultaneous overblasting compared to the prior art, the only difference being use of a binary mixture of texturing shot grades rather than a single shot grade. However, it is clear that poorer coverage is obtained with steel shot compared to a comparable mixture of ceramic shot (i.e., 95% coverage is achieved in four passes in Example #3, whereas only 85% coverage is obtained after eleven passes in Example #12). Similarly, in Example #8, 100% coverage results after four passes, while in Example #14, after eleven passes only 85% coverage is obtained. Using the steel shot mixtures of Examples #12 and #14 under these operating conditions, the general coverage equation predicts that eighteen passes would be needed to achieve a minimum acceptable 95% coverage, and twenty-three passes would be required to obtain a full 98% coverage or saturation.

The reason for the poorer coverage efficiency is largely related to mass transport. While ceramic shot has a density of about 3.75–3.85 gms/cm$^3$, cast steel shot typically has a density of about 7.70–7.80 gms/cm$^3$. With steel shot being more than twice as dense as ceramic shot, less than half the number of individual pellets will theoretically be projected per unit time, contributing to a much poorer coverage rate. The poor coverage rate associated with steel shot is further aggravated by its poorer "fluid" flow properties, since it is heavier and typically less perfectly spherical, with a rougher surface texture than ceramic shot. While the lower density of ceramic shot reduces its peening intensity at a given impact velocity vis-a-vis steel shot, air-blast machines can more easily accelerate ceramic shot to much higher velocities, thus negating much if not all of the disadvantageous density effect. The slightly lower roughness values obtained in Examples #12 and #14 with steel texturing shot using a simultaneous overblasting steel shot, compared to the ceramic shot counterparts (Examples #3 and #8, respectively), suggest slightly less striking force or peening intensity was achieved with the steel shot. Further, the lower peak counts, as with Examples #1 and #7, are indicative of incomplete coverage.

In Examples #15 and #16, the same shot grade mixtures as in Examples #12 and #14, respectively, were used with much higher air pressure to increase shot flow, coverage and impact velocity. The increased peening intensity and coverage achieved in Examples #15 and #16 is evidenced by the significantly higher texture roughnesses and peak counts compared to Examples #12 and #14. However, the 4.0 kg/cm$^2$ (57 psig) air pressure used with the last two examples is at or near the operating limit of the blasting equipment employed. Still higher peening intensities or use of even larger steel shot grades than Examples #15 and #16, with resultant greater roughnesses attainable, would require more powerful blasting equipment of the centrifugal wheel type. Vacuum-feed air blast machines of the type used for texturing of the large, production plates of this invention and described in detail herein, are less effective at increasing shot flow and coverage at high operating air pressures than the direct pressure feed air-blast machines of the type employed for this trial, since with the former, shot feed rate is regulated by suction created by the blast gun air injector venturi effect, which is not as linear as direct pressure regulation. However, when using the lighter ceramic shot of the grades employed in Examples #2 through #6, even the least powerful vacuum machines are quite effective in uniformly texturing stainless steel press plates.

The aforementioned description is not to be interpreted to exclude other arrangements advantageously employing the method and product of the present invention. For example, the use of a mixture of different grades of ceramic shot may be used to finish other surfaces of other materials. It may also be utilized on products other than press plates for laminates. Different mixtures of different grades of shot may be used which utilize the principles of the present invention. It is to be understood that the above described method and product is merely an illustrative embodiment of the principles of this invention and that numerous other arrangements and advantages may be devised by those skilled in the art without departing from the spirit and scope of the invention.

TABLE I

SIMULTANEOUS MIXED SHOT PEENING & OVERBLASTING TEXTURED PRESS PLATE TRIALS[1]

| | SHOT MIXTURE | | | | | | | |
|---|---|---|---|---|---|---|---|---|
| | TYPE | GRADES | | | | | | |
| | | TEXTURING | | | OVERBLASTING | | GUN[2] | | |
| TRIAL NUMBER | CERAMIC (4) DIA. (μm) | B16 850–1180 | B20 600–850 | B30 425–600 | B60 125–250 | B125 5–125 | PRESSURE kg/cm² | NUMBER PASSES | % COVERAGE (VISUAL) |
| 1 | | | 50% | 50% | | | 1.5 | 4 | 90 |
| +1A | | | | | 100% | | 1.5 | 1 | 100 |
| 2 | | | 30% | 30% | 40% | | 1.5 | 4 | 100 |
| 3 | | | 37.5% | 37.5% | 25% | | 1.5 | 4 | 95 |
| 4 | | | 45% | 45% | 10% | | 1.5 | 4 | 95 |
| 5 | | | 37.5% | 37.5% | | 25% | 1.5 | 3 | 100 |
| 6 | | | 45% | 45% | | 10% | 1.5 | 3 | 100 |
| 7 | | 50% | | 50% | | | 1.5 | 5 | 90 |
| +7A | | | | | 100% | | 1.5 | 1 | 100 |
| 8 | | 37.5% | | 37.5% | 25% | | 1.5 | 4 | 100 |
| 9 | | 37.5% | 37.5% | | 25% | | 1.5 | 4 | 100 |
| 10 | | 37.5% | | 37.5% | | 25% | 1.5 | 3 | 100 |
| | CAST STEEL AVG. DIA. (μm) | S390 991 | S330 838 | S230 584 | S70 178 | | | | |
| 11 | | | 50% | 50% | | | 1.5 | 15 | 85 |
| 12 | | | 37.5% | 37.5% | 25% | | 1.5 | 11 | 85 |
| 13 | | 50% | | 50% | | | 1.5 | 15 | 85 |
| 14 | | 37.5% | | 37.5% | 25% | | 1.5 | 11 | 85 |
| 15 | | | 37.5% | 37.5% | 25% | | 4.0 | 8 | 95 |
| 16 | | 37.5% | | 37.5% | 25% | | 4.0 | 8 | 95 |

| | SHOT MIXTURE | | | | | | | | |
|---|---|---|---|---|---|---|---|---|---|
| | TYPE | GRADES | | | | | | | |
| | | TEXTURING | | | OVERBLASTING | | | ROUGHNESS[3] | | PEAK[3] |
| TRIAL NUMBER | CERAMIC (4) DIA. (μm) | B16 850–1180 | B20 600–850 | B30 425–600 | B60 125–250 | B125 5–125 | ISO 60° GLOSS | Ra (μm) | Rz (μm) | COUNT per cm |
| 1 | | | 50% | 50% | | | 146 | 1.55 | 9.00 | 27 |
| +1A | | | | | 100% | | 90 | 1.26 | 9.75 | 35 |
| 2 | | | 30% | 30% | 40% | | 97 | 1.36 | 10.10 | 47 |
| 3 | | | 37.5% | 37.5% | 25% | | 145 | 1.26 | 8.94 | 35 |
| 4 | | | 45% | 45% | 10% | | 107 | 1.60 | 11.38 | 32 |
| 5 | | | 37.5% | 37.5% | | 25% | 89 | 1.28 | 8.88 | 32 |
| 6 | | | 45% | 45% | | 10% | 105 | 1.36 | 9.83 | 30 |
| 7 | | 50% | | 50% | | | 105 | 1.80 | 13.86 | 27 |
| +7A | | | | | 100% | | 95 | 1.44 | 8.88 | 32 |
| 8 | | 37.5% | | 37.5% | 25% | | 103 | 1.29 | 9.15 | 36 |
| 9 | | 37.5% | 37.5% | | 25% | | 90 | 1.70 | 11.38 | 34 |
| 10 | | 37.5% | | 37.5% | | 25% | 102 | 1.32 | 9.26 | 36 |
| | CAST STEEL AVG. DIA. (μm) | S390 991 | S330 838 | S230 584 | S70 178 | | | | | |
| 11 | | | 50% | 50% | | | — | 1.59 | 10.25 | 28 |
| 12 | | | 37.5% | 37.5% | 25% | | 150 | 1.18 | 8.51 | 26 |
| 13 | | 50% | | 50% | | | — | 1.30 | 7.64 | 28 |
| 14 | | 37.5% | | 37.5% | 25% | | 97 | 1.24 | 9.60 | 26 |
| 15 | | | 37.5% | 37.5% | 25% | | — | 2.25 | 14.29 | 39 |
| 16 | | 37.5% | | 37.5% | 25% | | — | 2.34 | 14.30 | 32 |

[1]Matrasur PHF03-60 pressure type air-blast machine; 10 × 10 cm samples AISI 410 S.S. buffed to #8 mirror finish.
[2]All other machine conditions constant: Gun distance 35 cm, traversing speed 20 cm/min, 2.8 sec/stroke, stroke length 60 cm
[3]Measurements made with Perthometer ® Model M4P profilometer with 12.5 mm measureing length and 0.5 μm slice threshold.
[4]Zirblast ® grades made by Societe Europeenne des Produits Refractaires (SEPR) France.

What is claimed is:

1. A press plate for producing decorative laminate having a textured surface formed by shot peening the surface simultaneously with a mixture of shot particles, the mixture of shot particles including a first quantity of shot comprising shot grades for imparting a texture to the surface and a second quantity of shot comprising shot grades for adjusting a gloss level of the surface of the plate.

2. The press plate of claim 1 in which the first quantity of shot is at least 60 percent of the total shot and is essentially 250 μm or larger in diameter and the second quantity of shot is up to 40 percent of the total shot and is essentially between 5 and 250 μm in diameter.

3. The press plate of claim 2 in which the first quantity of shot further comprises a mixture of shot having a large grade of shot essentially between 600 and 850 μm in diameter and a medium grade of shot essentially between 425 and 600 μm in diameter.

4. The press plate of claim 2 in which the first quantity of shot further comprises a mixture of shot having a large grade of shot essentially 850 μm or larger in diameter and a medium grade of shot essentially between 600 and 850 μm in diameter.

5. The press plate of claim 2 in which the first quantity of shot further comprises a mixture of shot having a large grade of shot essentially 850 μm or larger in diameter and a medium grade of shot essentially between 425 and 600 μm in diameter.

6. The press plate of claim 1, wherein at least one of said first quantity of shot and said second quantity of shot includes ceramic shot particles.

7. A press plate for producing decorative laminate having a textured surface having at least 95% peened coverage by the simultaneous impact of a mixture of shot particles through no more than eight peening operations, the mixture of shot particles including a first quantity of shot comprising shot grades for imparting a texture to the surface and a second quantity of shot comprising shot grades for adjusting a gloss level of the surface of the plate.

8. The press plate of claim 7, wherein at least one of said first quantity of shot and said second quantity of shot includes ceramic shot particles.

9. A press plate for producing decorative laminate having a textured surface formed by shot peening the surface simultaneously with a mixture of ceramic shot particles, the mixture of ceramic shot particles including a first quantity of ceramic shot comprising shot grades for imparting a texture to the surface and a second quantity of ceramic shot comprising shot grades for adjusting a gloss level of the surface of the plate.

10. The press plate of claim 9 in which the first quantity of ceramic shot is at least 60 percent of the total ceramic shot and is essentially 250 μm or larger in diameter and the second quantity of ceramic shot is up to 40 percent of the total ceramic shot and is essentially between 5 and 250 μm in diameter.

11. The press plate of claim 10 in which the first quantity of ceramic shot further comprises a mixture of ceramic shot having a large grade of ceramic shot essentially between 600 and 850 μm in diameter and a medium grade of ceramic shot essentially between 425 and 600 μm in diameter.

12. The press plate of claim 10 in which the first quantity of ceramic shot further comprises a mixture of ceramic shot having a large grade of ceramic shot essentially 850 μm or larger in diameter and a medium grade of ceramic shot essentially between 600 and 850 μm in diameter.

13. The press plate of claim 10 in which the first quantity of ceramic shot further comprises a mixture of ceramic shot having a large grade of ceramic shot essentially 850 μm or larger in diameter and a medium grade of ceramic shot essentially between 425 and 600 μm in diameter.

14. The press plate of claim 9 in which the textured surface of the press plate has at least 95% peening coverage by impact of the mixture of ceramic shot particles through no more than four peening operations.

15. A press plate for producing decorative laminate having a textured surface having at least 95% peened coverage by the simultaneous impact of a mixture of ceramic shot particles through no more than four peening operations, the mixture of ceramic shot particles including a first quantity of ceramic shot comprising shot grades for imparting a texture to the surface and a second quantity of ceramic shot comprising shot grades for adjusting a gloss level of the surface of the plate.

* * * * *